3,461,006
Patented Aug. 12, 1969

3,461,006
GELLED PYROTECHNIC FLARE COMPOSITION CONTAINING WATER-SOLUBLE CARBOXY VINYL POLYMER RESIN
Richard J. Fay and Philip J. Keitel, Denver, Colo., assignors, by mesne assignments, to the United States of America as represented by the Secretary of the Navy
No Drawing. Filed Oct. 27, 1967, Ser. No. 678,512
Int. Cl. C06d 1/10
U.S. Cl. 149—19                    3 Claims

ABSTRACT OF THE DISCLOSURE

A gelled pyrotechnic composition comprised of between 32 and 52 percent of a fuel such as methanol, between 45 and 65 percent of an oxidizing material, such as a perchlorate, and between 0.5 and 5 percent of a water-soluble carboxy vinyl polymer resin.

BACKGROUND OF THE INVENTION

The present invention relates to the production of colored flames and more particularly to a pyrotechnic composition for use as a military signaling flare.

Various types of devices and compositions have heretofore been used as flares by the military forces. For example, in U.S. Patent 3,258,373, which issued June 28, 1966, to Bernard E. Douda, there is disclosed a castable pyrotechnic composition comprised of strontium perchlorate and an acrylic monomer. As there are many different applications and conditions for which a military flare may be employed, numerous devices and formulas must be utilized to serve the needs of the military forces. For example, flares are launched from submarines, aircraft, and from the surface and, when ignited, generate a flame, flash, infrared radiation, smoke, or sound display (or combinations of these effects) for a broad variety of purposes. These purposes include visual and audible signaling, area or target illumination, reference point marking, indication of practice weapon fuze action or impact, tracking, weapon effects simulation, and screening.

SUMMARY OF THE INVENTION

The present invention relates to a pyrotechnic composition which has use as a military signaling device. The composition is comprised of between 32 and 52 percent of a fuel, such as methanol, between 45 and 65 percent of an oxidizing material, such as a perchlorate, and between 0.5 and 5 percent of a water-soluble carboxy vinyl polymer resin. The composition is a gel and, depending on the particular perchlorate used, can be burned to provide a colored flame or can be used to color another flame such as a flame produced from the burning of acetylene or hydrogen.

It is therefore a general object of the present invention to provide an improved pyrotechnic composition for providing a colored flame.

Other objects and advantages of the present invention will be readily appreciated as the same becomes better understood by reference to the following detailed description.

DESCRIPTION OF THE PREFERRED EMBODIMENT

A gel of methanol containing a colorant salt, such as either barium perchlorate or strontium perchlorate, is produced by adding from between 0.5 and 5 percent, by weight, of a water-soluble carboxy vinyl polymer resin. The amount of oxidant concentration depends on the solubility of the oxidant in the fuel, however lesser quantities than maximum concentration will produce satisfactory colored flames. It has been found that between 45 and 65 percent of either barium perchlorate or strontium perchlorate when mixed with between 32 and 52 percent of methanol will produce an intense colored flame.

The following examples are illustrative of the invention. In each of the examples, the water-soluble carboxy vinyl polymer resin which was used was obtained from the B. F. Goodrich Chemical Company, a division of the B. F. Goodrich Company, and is sold under the trademark Carbopol 940.

Example I

|  | Grams |
|---|---|
| Strontium perchlorate | 50 |
| Methanol | 100 |
| Water-soluble carboxy vinyl polymer resin | 4.6 |

The strontium perchlorate was dissolved in the methanol and then the water-soluble carboxy vinyl polymer resin was added to form a gel.

Approximately five grams of the gelled composition was placed in a burner, which is more fully described in applicants' copending application entitled, "Flame Coloring Device," Ser. No. 678,252, which was filed Oct. 26, 1967. The five grams of gelled composition burned for about ten minutes and provided a very intense red flame. In operation, heat is absorbed from the flame by the burner and transferred to the gel whereby the heat vaporizes some of the methanol. The vapor pressure increases until the force it creates on the surface of the gel is sufficient to cause the gel to extrude through feed holes in the burner into the flame.

Example II

|  | Grams |
|---|---|
| Barium perchlorate | 50 |
| Methanol | 100 |
| Water-soluble carboxy vinyl polymer resin | 4.6 |

The composition was mixed as in Example I and then burned in the burner to produce a green flame.

Data was obtained from the colorimeter with the strontium perchlorate gel and the barium perchlorate gel as light sources and the data indicates a dominant wavelength of 560 millimicrons and a purity of 75 percent from the barium and a dominant wavelength of 608 millimicrons and a purity of 95 percent from the strontium.

In order to test the potential hazard in using a methanol-perchlorate gel, several grams of gel was dropped on a ceramic-surfaced hot plate which was heated to 500 degrees F. No popping occurred and the gel slowly dried up and left a residue of salt and traces of carbon without producing any other effects.

Obviously many modifications and variations of the present invention are possible in the light of the above teachings. For example, while methanol was used as the fuel in the above-listed examples, other liquid fuel, such as ketones, ethers, and hydrocarbons, which will dissolve the oxidizer, will work equally as well. It is therefore to be understood, that within the scope of the appended claims, the invention may be practiced otherwise than as specifically described.

We claim:
1. A combustible gelled composition comprising:
   from between 32 and 52 percent of methanol,
   from between 45 and 65 percent of a material selected from the group consisting of barium perchlorate and strontium perchlorate, and
   from between 0.5 and 5 percent of a water-soluble carboxy vinyl polymer resin.
2. A combustible gelled composition as set forth in claim 1 wherein said material is barium perchlorate.
3. A combustible gelled composition as set forth in claim 1 wherein said material is strontium perchlorate.

References Cited
UNITED STATES PATENTS

| | | | |
|---|---|---|---|
| 3,242,020 | 3/1966 | Atkins et al. | 149—19 |
| 3,296,045 | 1/1967 | Douda | 149—75 |
| 3,258,373 | 7/1966 | Douda | 149—19 |

BENJAMIN R. PADGETT, Primary Examiner

U.S. Cl. X.R.

44—7; 149—20, 83